Jan. 2, 1951

W. E. BRADLEY
PULSE TYPE RADIO RANGE TRACKING
AND INDICATING SYSTEM 2,536,346

Filed March 1, 1946

CONTROL PRIOR TO SIMULTANEOUS OCCURRENCE OF
QUENCH OSCILLATOR AND RECEIVED PULSES.

CONTROL UPON SIMULTANEOUS
OCCURRENCE OF QUENCH OSC.
AND RECEIVED PULSES

INVENTOR.
WILLIAM E. BRADLEY

BY

AGENT

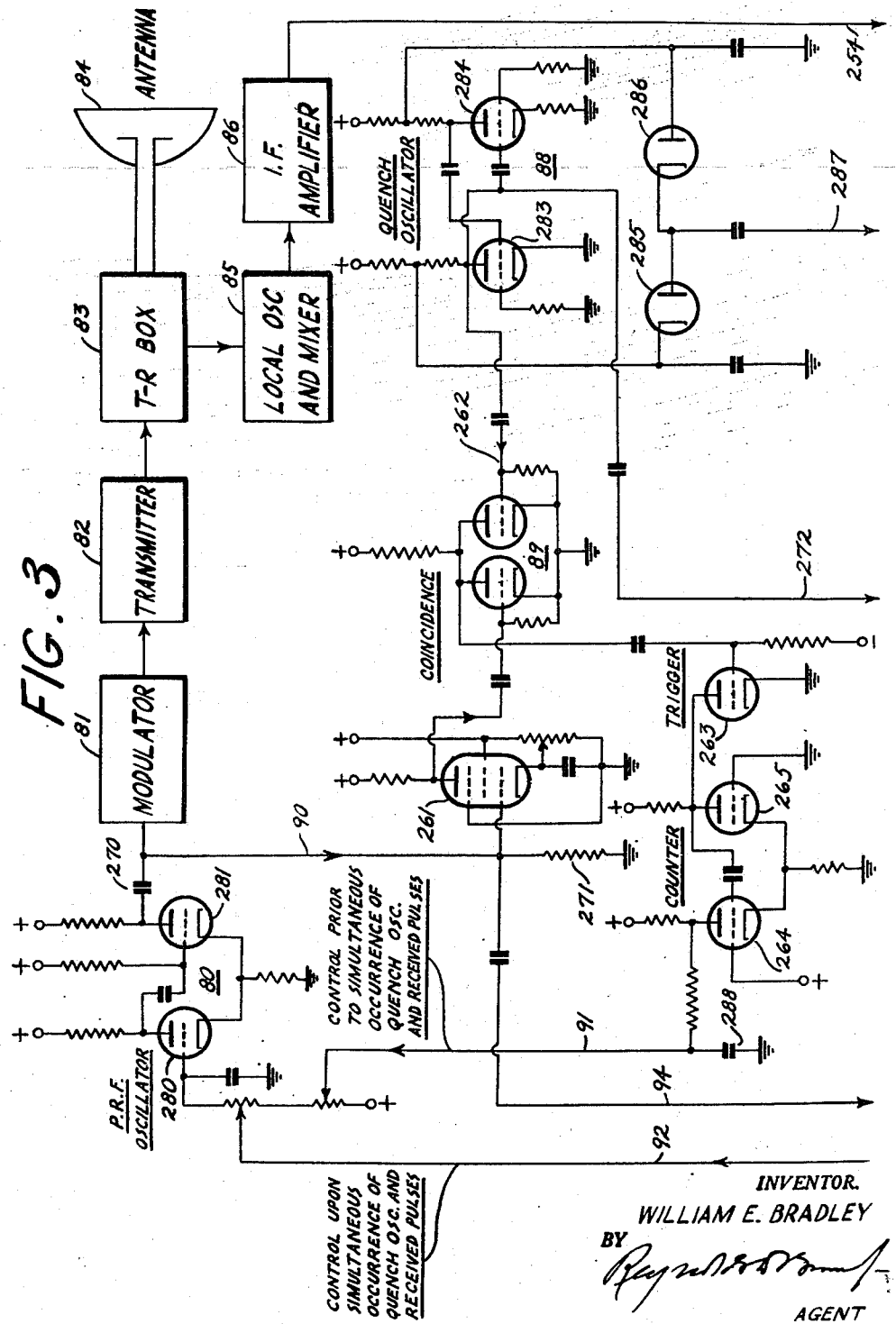

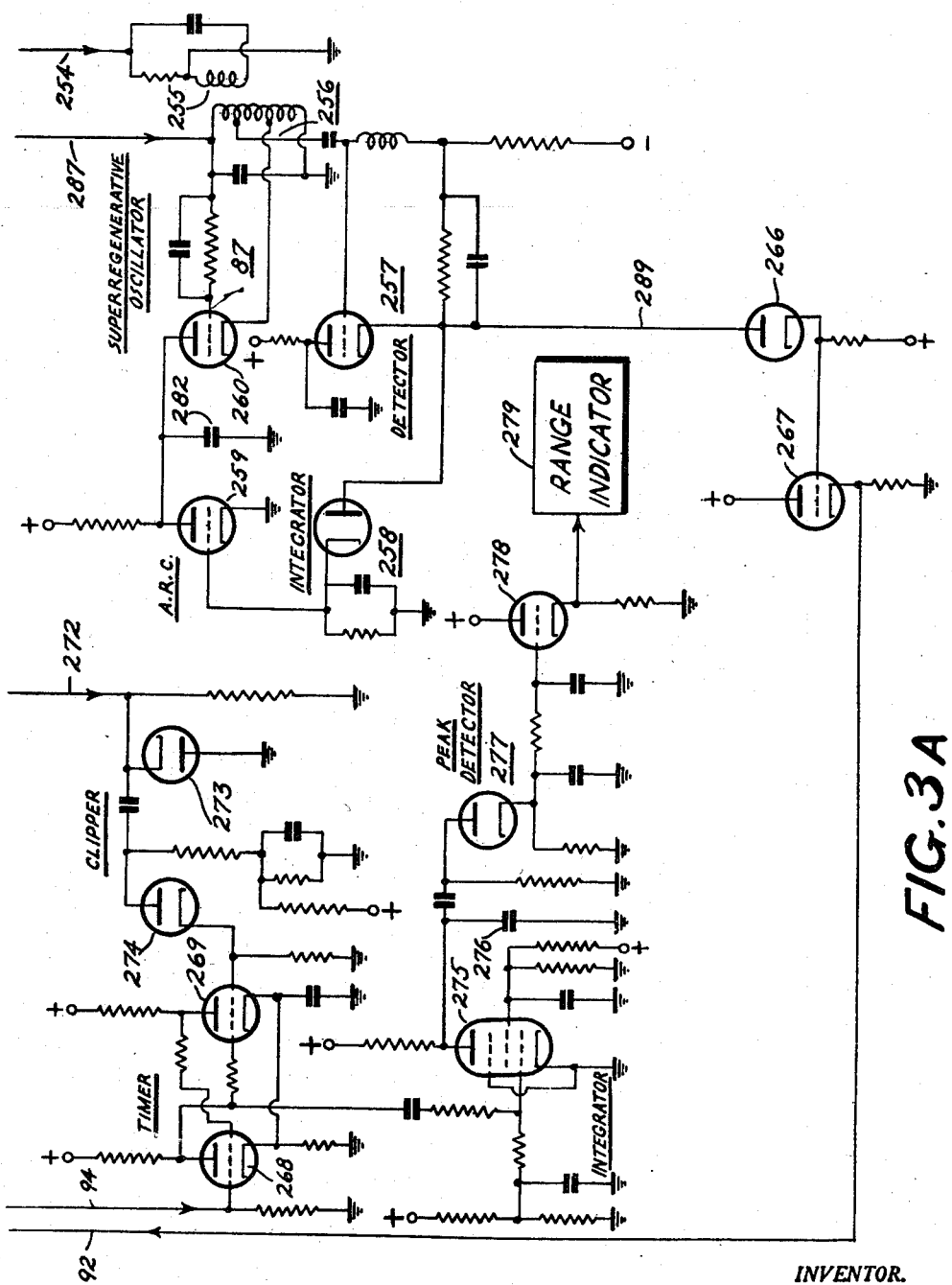

Patented Jan. 2, 1951

2,536,346

UNITED STATES PATENT OFFICE 2,536,346

PULSE TYPE RADIO RANGE TRACKING AND INDICATING SYSTEM

William E. Bradley, Swarthmore, Pa., assignor, by mesne assignments, to Philco Corporation, Philadelphia, Pa., a corporation of Pennsylvania Application March 1, 1946, Serial No. 651,398

5 Claims. (Cl. 343—13)

This invention relates to radio ranging systems suitable for both military and non-military application. Specifically it relates to such systems which because of their simplicity and light weight are particularly adapted for use in aircraft. In military application, systems in accordance with the invention are, for example, adapted for use in conjunction with optical gun sights to provide information regarding the range to a target optically sighted upon from a military aircraft or other vehicle in which the equipment may be located. In non-military application the systems are useful, for example, as altimeters or obstacle locators installed in commercial aircraft. They may also be used in fixed installations on the ground or in ships to determine the distance from their point of installation to any target capable of reflecting high frequency radio signals. Other applications of the systems will occur to those skilled in the art and familiar with the application of similar systems in the past.

Previously developed systems of this sort have suffered greatly from their considerable weight and bulk. Most such systems have employed receivers of the superheterodyne variety to amplify the relatively weak, received, object-reflected signals from targets. One feature of the systems in accordance with the present invention is their employment of a superregenerative receiver. This alone permits a substantial reduction in weight and bulk of the equipment, through the partial or complete elimination of the intermediate frequency amplifier, while at the same time providing adequate amplification of received, reflected signals. The use of a superregenerative receiver also greatly simplifies the problem of accurate range measurement.

The principal object of the invention is to provide a simple, light-weight, accurate radio ranging system suitable for use in both military and non-military aircraft.

Another object of the invention is to provide such a system giving a continuous range indication, once a target has been located, regardless of whether the distance from the equipment to the target is increasing or diminishing.

Another object of the invention is to provide such a system yielding range information in the form of a voltage which varies linearly with range, and is suitable for application to any one of a variety of familiar electrical indicators or control devices.

Another object of the invention is to provide such a system embodying circuits which, when externally actuated, automatically control the equipment so as to cause it to search for any target within its inherent range limits and which, once the target has been located, further control the equipment so as to cause it to lock on the target and thereafter continually follow it while giving a continuous indication of target range and subsequent changes therein.

Other objects and features of the invention will become apparent from a consideration of the following description and drawings in which.

Figure 2:
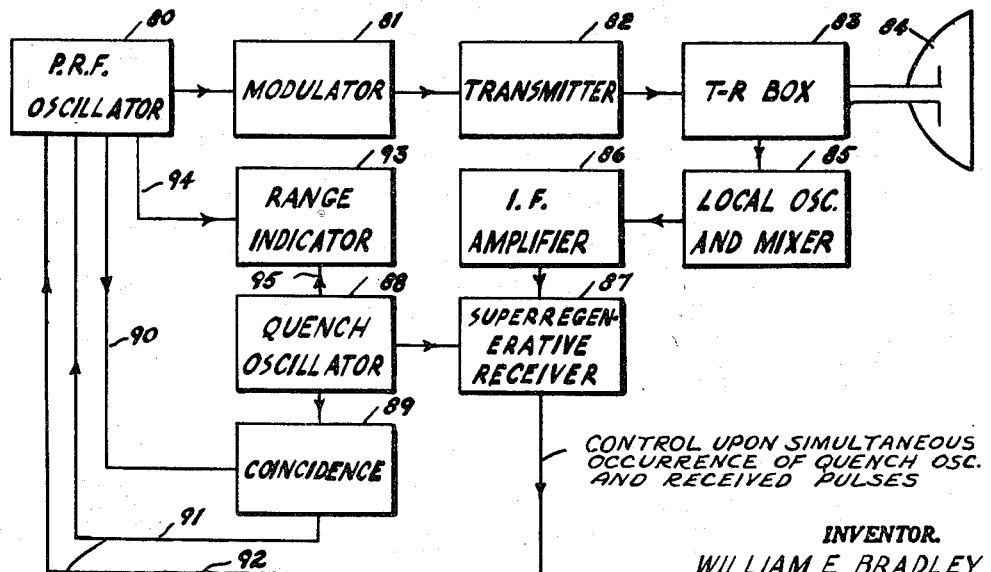
Figure 2 is a block diagram illustrating the general arrangement and features of another embodiment of the invention.

Figures 3 and 3A taken together constitute a schematic diagram of an embodiment of the invention in accordance with the block diagram of Figure 2.

Figure 1:
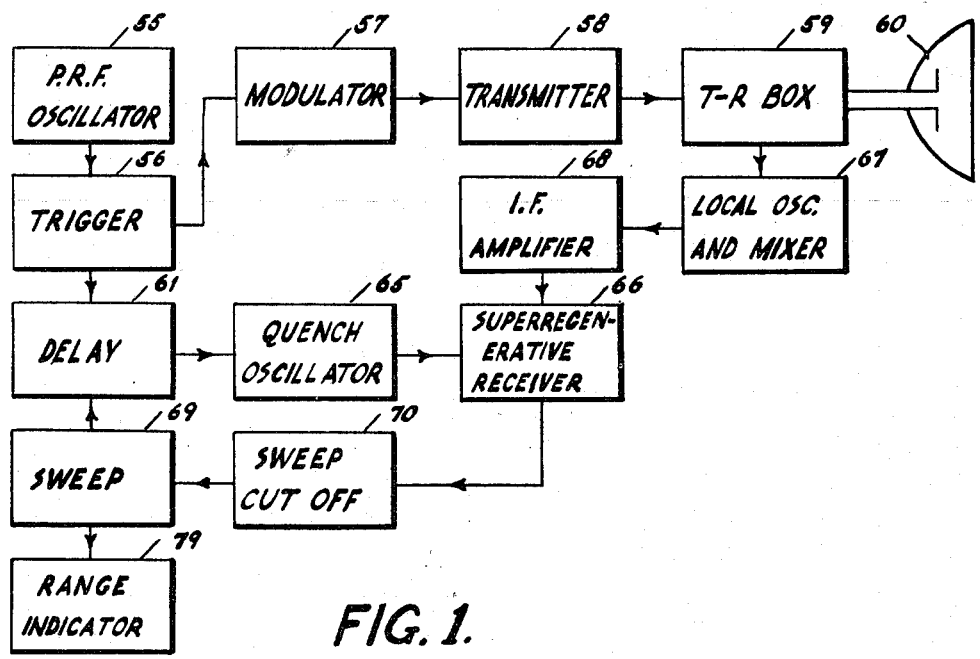
Figure 1 is a block diagram illustrating the general arrangement and features of one embodiment of the invention.

The general arrangement and mode of operation of one embodiment of the invention will now be described with reference to the block diagram of Figure 1. Referring to Figure 1, the pulse repetition frequency (P. R. F.) oscillator 55 may comprise any suitable oscillator, such as a multivibrator, generating time-spaced pulse signals at a frequency of, for example, 2,000 cycles per second. These pulses are supplied to a trigger circuit 56 which may comprise a differentiating circuit for producing negative pulses corresponding to the leading edges of negative pulses from the P. R. F. oscillator and positive pulses corresponding to the trailing edges thereof, and a suitable amplifier for amplifying and inverting only the positive pulses obtained by differentiation to produce negative pulses of shorter duration at the P. R. F. rate. These shorter duration pulses are supplied through an amplifier to the modulator 57 which in turn keys the transmitter 58 to generate pulses of radio frequency energy for transmission through T-R box 59 to antenna 60 and thence into space. Transmitter 58 may be any suitable generator of microwave energy, such as a magnetron oscillator, adapted to be keyed in response to pulse signals. T-R box 59 may be of conventional form, comprising a cavity resonator and associated spark gap, adapted to permit free transmission of pulsed radio frequency energy from transmitter 58 to antenna 60, while at the same time minimizing the amount of such energy reaching local oscillator and mixer 67, thereby to prevent interference with its operation and possible destruction of the crystal usually employed therein. The negative pulses from trigger circuit 56 are also utilized to initiate the generation of pulses of variable duration in the delay circuit 61. The delay circuit may also include a differentiating circuit for generating a signal comprising positive pulses corresponding to the leading edges of the variable duration pulses and negative pulses corresponding to the trailing edges thereof. The negative pulses just referred to are utilized to synchronize quench oscillator 65 which may comprise a freely oscillating multivibrator synchronized by these negative pulses in a particular manner hereinafter to be explained. Pulses generated by the quench oscillator at the P. R. F. rate, but delayed by varying amounts with reference thereto, are utilized to unquench the superregenerative receiver 66 at varying intervals of time after each generated pulse from the P. R. F. oscillator. Pulses of transmitted energy reflected by target objects within range of the system are intercepted by antenna 60 as in any conventional radar system. They are transmitted through T-R box 59 to a local oscillator and mixer 67 where their carrier frequency, but not their rate of occurrence, is altered and they are then amplified in intermediate frequency amplifier 68. The amplified intermediate frequency pulses are then transmitted to the input of superrregenerative receiver 66 and, whenever one of them occurs simultaneously with a pulse from quench oscillator 65, it will be amplified and detected in the superregenerative receiver. The duration of the pulses generated by delay circuit 61 may be varied automatically, for example from 1 to 14 microseconds, at a low frequency rate of for example 10 cycles per second (the 14 microsecond duration corresponding to a maximum target range of approximately 2,300 yards, and the 1 microsecond duration corresponding to the minimum workable range of the system of approximately 165 yards). The delay of the quench oscillator pulses will therefore vary from 1 to 14 microseconds behind successive pulses generated by the P. R. F. oscillator 55. To control this delay there is generated, in sweep circuit 69, a saw-tooth voltage recurring at a 10 cycle per second rate. This saw-tooth voltage is adapted to control the delay circuit 61 so as to vary the delay of pulses produced by it, and hence of the quench oscillator pulses, from 1 to 14 microseconds behind the P. R. F. oscillator pulses. When one of the quench oscillator pulses corresponds in time to a received pulse, the output from the superregenerative receiver 66 may be utilized to actuate a sweep cut-off circuit 70. This circuit momentarily interrupts the growth of the saw-tooth wave generated by the sweep circuit 69 during the cycle in which this occurs and furthermore may be adapted momentarily to reduce its amplitude by a predetermined amount. This amount may be made sufficient to reduce the delay of a few immediately succeeding pulses generated by delay circuit 61 to such an extent that they will occur before the arrival of target-reflected pulses at the receiver. Accordingly the growth of the saw-tooth wave will resume immediately following the simultaneous occurrence of a delayed and a received pulse and the delay of quench oscillator pulses will again increase until one again coincides with a received pulse, whereupon the action just described will repeat itself.

In practice sweep cut-off circuit 70 is adjusted so that, upon the simultaneous occurrence of a received pulse and a quench pulse, the voltage generated by the sweep circuit 69 will be reduced by a sufficient amount to take account of the fact that the target may approach the equipment by some predetermined amount, or at some predetermined rate, during the interval preceding the next received pulse. In other words the delay of the next succeeding quench oscillator pulse is backed off sufficiently to take account of this possibility.

Inasmuch as the maximum voltage of the wave form generated by sweep circuit 69, at any time when quench oscillator pulses and received pulses are occurring simultaneously, will be a measure of target range, a suitable range indicator 79 responsive to this maximum voltage may be connected directly to sweep circuit 69.

It is significant and a feature of the invention that the range voltage thus derived depends solely upon the delay, with respect to transmitted pulses, of unquenching pulses which coincide with received target pulses. Contrary to the situation existing in a number of prior art systems, it is not required to maintain the shape of received target signals through a plurality of stages of intermediate frequency amplification. In the present system, such amplification is reduced to a minimum by the specialized application of a superregenerative receiver, and thereby this major source of error is eliminated.

A detailed description of an embodiment of the invention in accordance with Figure 1, is contained in the copending application of Wilson P. Boothroyd and Albert L. Free, Serial No. 651,888, filed March 4, 1946.

Referring now to Figure 2, which illustrates another embodiment of the invention, P. R. F. oscillator 80, modulator 81, transmitter 82, T-R box 83, antenna 84, local oscillator and mixer 85, intermediate frequency amplifier 86, superregenerative receiver 87, and quench oscillator 88 may be substantially the same both in structure and in mode of operation as the corresponding elements of the embodiment shown in Figure 1, with the exception that in this embodiment quench oscillator 88 is a freely running oscillator held by suitable means to a frequency of, for example, 80 kilocycles per second. P. R. F. oscillator 80, prior to the simultaneous occurrence of a pulse from the quench oscillator and a received, target-reflected pulse, is controlled therefrom, through the medium of coincidence circuit 89, to a frequency differing slightly from a subharmonic of the quench oscillator frequency in either positive or negative sense. For example, if the subharmonic selected is the 40th, the frequency of the P. R. F. oscillator may be controlled to either 1990 or 2010 cycles per second so that a difference frequency of ±10 cycles per second exists between the frequency of the P. R. F. oscillator 80 and the 40th subharmonic of the quench oscillator frequency (2000 cycles per second). In either instance there will occur ten coincidences per second of quench oscillator and P. R. F. pulses. This control may be effected by feeding pulses from P. R. F. oscillator 80 through connection 90, and pulses from quench oscillator 88, to coincidence circuit 89 which is adapted to generate a control voltage in response to the simultaneous occurrence of pulses from the two sources. This voltage is supplied through connection 91 to P. R. F. oscillator 80 to maintain the desired relationship between its frequency and that of quench oscillator 88.

The net effect of controlling the frequency of the P. R. F. oscillator 80 in this manner is to cause quench oscillator 88, prior to the simultaneous occurrence of a pulse from the quench oscillator and a received, target-reflected signal, to generate pulses delayed by varying amounts with respect to the P. R. F. oscillator pulses.

In accordance with the principle of the invention however, upon the simultaneous occurrence of a quench oscillator pulse and a received pulse, the frequency of P. R. F. oscillator 80 must be readjusted momentarily, preferably so as to differ in the opposite sense from the 40th subharmonic of the quench oscillator frequency. In the instance in which the pulse repetition frequency originally exceeds the latter frequency this will mean momentarily reducing the pulse repetition frequency to less than 2000 cycles per second and will be the equivalent of momentarily reducing the delay of quench oscillator pulses with reference to P. R. F. pulses as was done in the instance of the embodiment of Figure 1 upon the simultaneous occurrence of a delayed P. R. F. and a received pulse. The alternative case in which the pulse repetition frequency is originally lower than the quench oscillator frequency and is momentarily increased above 2000 cycles per second, upon the simultaneous occurrence of the two pulses, corresponds to a mode of operation perfectly feasible but not described for the embodiment of Figure 1—namely, that in which the delay of quench oscillator pulses with reference to P. R. F. pulses is decreased rather than increased in the course of each sweep of the target range. The alterations to the embodiment of Figure 1 to achieve this alternative mode of operation will be obvious to those skilled in the art.

The objective as above set forth is achieved by utilizing the output of the superregenerative receiver 87, supplied to P. R. F. oscillator 80 through connection 92, further to control the frequency of the P. R. F. oscillator. Following the simultaneous occurrence of a given quench oscillator pulse and a given received pulse and the consequent momentary alteration in the pulse repetition frequency, the system will revert to its initial mode of operation in which P. R. F. oscillator 80 is controlled by coincidence circuit 89 so as to maintain a difference of 10 cycles per second between its frequency and the 40th subharmonic of the frequency of quench oscillator 88. This mode of operation will continue until a received reflected pulse again coincides with a quench oscillator pulse, at which time the output from the superregenerative receiver 87 will again control the frequency of P. R. F. oscillator 80 in the manner above described. It will be apparent that the amount by which the pulse repetition frequency is altered upon the simultaneous occurrence of a quench oscillator and a received pulse should be sufficient to take account of any change in target range which might occur prior to the occurrence of the next succeeding quench oscillator pulse. This adjustment is analagous to the one made to the embodiment of Figure 1 wherein, upon the simultaneous occurrence of a quench oscillator and a received pulse, the sweep voltage is momentarily reduced by an amount necessary to effect the required reduction in delay of immediately succeeding quench oscillator pulses.

Obviously the delay time, between P. R. F. oscillator pulses and 40th pulses of the quench oscillator which occur simultaneously with received reflected pulses, will be a measure of target range and accordingly in this embodiment of the invention a range indicator 93 is utilized which is adapted to give a range indication in response to P. R. F. oscillator pulses and quench oscillator pulses supplied to it through the connections 94 and 95.

A detailed explanation will now be given of the circuits which might be used to achieve the embodiment of the invention in accordance with the general showing of the block diagram of Figure 2. These circuits are shown in the partially schematic diagram of Figures 3 and 3A.

This embodiment has already been described in general terms with reference to the block diagram of Figure 2 and, in order to relate corresponding components of the schematic to those of the block diagram, the same reference characters will be used wherever this may be feasible. The pulse repetition frequency oscillator 80 may be a multivibrator adjusted to oscillate at a frequency in the neighborhood of 2,000 cycles per second and producing substantially equal positive and negative half cycles. However, it will be recalled from the discussion of Figure 2 that the P. R. F. oscillator frequency is controlled with reference to the quench oscillator frequency during scanning to maintain a difference, between its frequency and a subharmonic of the quench oscillator frequency, of the order of 10 cycles per second. The frequency of the multivibrator 80 may thus be controlled in response to the bias applied to the grid of tube 280. In order to secure narrower pulses at the pulse repetition frequency, the output of tube 281 of the P. R. F. multivibrator is differentiated by means of a network comprising condenser 270 and resistor 271. The positive pulses resulting from differentiation and corresponding to the leading edges of the pulses from the multivibrator are used to control modulator 81 which in turn controls the generation of pulses of microwave energy at the pulse repetition frequency by transmitter 82. As in the case of the embodiments previously discussed, these are supplied through T-R box 83 to antenna 84. Received target reflected pulses are transmitted from antenna 84 through T-R box 83 to local oscillator and mixer 85. Pulses of intermediate frequency energy are amplified in intermediate frequency amplifier 86 and supplied to superregenerative oscillator 87 through connection 254 and inductor 255 coupled to tank circuit 256. To provide automatic regeneration control for superregenerator 87, signal derived from a tap on the inductor of tank circuit 256 is supplied to a detector 257, the output of which is fed to an integrator 258 having a time constant of the order of magniude of the interval between successive quench oscillator pulses. The output of integrator 258 is supplied to the grid of an automatic regeneration control tube 259 having its plate connected to the plate of the oscillator tube 260 and a condenser 282 connected between it and ground. The voltage developed across condenser 282 in the absence of any received signal may, by proper adjustment of the automatic regeneration control circuit, be made such as to maintain the superregenerative oscillator 87 at optimum sensitivity.

Quench oscillator 88 may be a multivibrator comprising tubes 283 and 284 adjusted to oscillate at a frequency of, for example, 80 kilocycles per second. The output from the plates of each of these tubes may be applied to quenching diodes 285 and 286 in push pull fashion to unquench superregenerative oscillator 87 at the 80 kilocycles per second rate, and to this end a connection 287 from the plate of diode 285 and the cathode of diode 286 to tank circuit 256 is provided. The advantage of this arrangement lies in the fact that there will be no shock excitation of the tank circuit on quenching or unquenching.

In order to maintain the proper frequency difference between the frequencies of P. R. F. oscillator 80 and quench oscillator 88, use is made of a coincidence circuit 89 comprising two triodes which may be connected in the manner shown. Pulses resulting from the differentiation of the P. R. F. pulses are supplied through an isolating tube 261 to the grid of one of these triodes. Also pulses from quench oscillator are supplied through connection 262 to the grid of the other triode. Output from the plate circuits of both triodes is supplied to the grid of a trigger tube 263, the bias on the grid of which is made such that the tube will not conduct unless pulses from the P. R. F. and quench oscillators occur simultaneously. The output of trigger tube 263 is supplied to a non-oscillatory multivibrator counter comprising tubes 264 and 265. This multivibrator is adjusted so that tube 265 will normally be cut off while tube 264 normally conducts. Upon the simultaneous occurrence of a P. R. F. and a quench oscillator pulse, the output of trigger tube 263 will momentarily alter this situation and cause tube 264 to cut off for a brief interval. During this interval the voltage across condenser 288 will be somewhat increased thereby increasing the bias on the grid of tube 280 of the P. R. F. oscillator. The circuits just described can readily be adjusted to maintain the desired difference between the frequency of the P. R. F. oscillator and the quench oscillator subharmonic.

As already explained in the description of Figure 2, it is desired, upon the simultaneous occurrence of an unquenching and a target reflected pulse, to modify the relationship between the frequencies of the P. R. F. and quench oscillators in order to lock the system on the target and give a continuous indication of target range. In doing this the frequency of the P. R. F. oscillator might be adjusted so as to correspond exactly to the subharmonic of quench oscillator 88 and this would yield satisfactory results assuming that the distance between the equipment and the target were to remain constant. However it is quite likely that in practice the target will be approaching the equipment and this would suggest the desirability, assuming that the P. R. F. oscillator during search was being maintained at a frequency higher than the subharmonic of the quench oscillator frequency, of reducing the P. R. F. oscillator frequency to a value somewhat lower than that of the quench oscillator in response to the receipt of a target signal. This would have the effect of reinitiating the sweep at a point corresponding to the distance somewhat less than the range at which the target signal was originally received and the system would then proceed to creep up on the target until the proper range had again been reached. The advantage of this mode of operation, which has already been discussed in connection with the other embodiments, is believed to be obvious inasmuch as it permits the system to continue following the target in range regardless of the fact that the distance from the equipment to the target may be diminishing. The means for achieving this result may comprise a connection 289 from detector 257 in the automatic regeneration control circuit of the superregenerative receiver through diode 266 to the grid of a cathode follower tube 267, and thence through connection 92 to the grid of tube 280 of the P. R. F. oscillator. In the presence of a target signal, because of the low impedance output provided by the cathode follower tube 267, the circuits just described will assume control over the operation of the P. R. F. oscillator and momentarily alter its frequency (or phase) despite the fact that control voltage will continue to be developed across condenser 288 by the coincidence circuit 89 and its associated trigger and counter tubes 263, 264 and 265. By connecting the cathode of diode 266 to a source of positive potential this control may be prevented from operating except on the output from detector 257 corresponding to the simultaneous arrival of a received signal and unquenching of the superregenerative receiver.

In the present embodiment range output is derived from a circuit which measures the interval between the occurrence of a given P. R. F. oscillator pulse and the next succeeding quench oscillator pulse. This circuit consists of a non-oscillatory multivibrator timer comprising triodes 268 and 269. A positive pulse corresponding to the leading edge of a P. R. F. oscillator pulse supplied through connection 94 to the grid of tube 268 will cause it to commence conducting and will cut off tube 269. Similarly a positive pulse from the quench oscillator supplied through connection 272 to the grid of tube 269 will cause the latter to commence conducting and tube 268 to cease conducting. Thus the interval during which tube 268 is conducting will be proportional to range whenever quench oscillator pulses and received target reflected pulses occur simultaneously. The negative pulses corresponding to the trailing edges of the P. R. F. oscillator pulses will have no effect on the timer circuits since in any case tube 268 will be cut off, prior to their occurrence, by the occurrence of a quench oscillator pulse. However, to prevent negative pulses from the quench oscillator from affecting operation of the timer circuit, it is desirable to include a clipper circuit comprising diodes 273 and 274 connected in the manner shown to limit the negative pulses corresponding to the trailing edges of the quench oscillator pulses. Because of the direct coupling between the quench oscillator and tube 269, the clipping of the negative pulses can not be complete, however it can be made sufficient to prevent their triggering the timer tube, and some positive bias may be applied to the grid of the succeeding integrator tube 275 which will then remove their effect completely. The grid of the latter tube, it will be noted, is connected direct to the plate of tube 268 and its function together with condenser 276 is to develop a saw-tooth voltage the peak value of which will be proportional to the interval during which tube 268 is conducting. Peak detector 277 serves to measure this peak value and to develop a voltage proportional thereto which is supplied through cathode follower 278 to range indicator 279.

Subject matter shown and described in this specification but not claimed herein is claimed in copending applications assigned to the assignee of the present invention as follows.

The following subject matter, in copending application of Wilson P. Boothroyd and Albert L. Free, Serial Number 651,888, filed March 4, 1946:

(1) A radio ranging system employing a transmitter of time-spaced pulse signals, a producer of other time-spaced pulse signals normally delayed by varying time intervals with reference to said transmitter pulses, a receiver of object-reflected transmitted pulses, and means responsive to the simultaneous occurrence of received and produced pulses for altering the delay of produced pulses with reference to transmitted pulses in a manner to prevent another such simultaneous occurrence during a predetermined time interval.

(2) The representative embodiment of such a system employing a sweep circuit, comprising a gas tube and a condenser, and a separate gas tube for discharging the condenser by a predetermined amount upon the simultaneous occurrence of received and produced pulses, as shown and described with reference to Figure 1 of this specification.

The following subject matter in copending application of Kenneth H. Emerson, Serial Number 651,649, filed March 2, 1946:

(1) A system comprising a superregenerative receiver of time-spaced pulse-modulated carrier wave signals, means for unquenching said receiver during time-spaced intervals, at least some of said intervals coinciding with the arrival of received pulses, and means for controlling the sensitivity of said receiver in response to its output in the absence of received signals.

(2) The representative embodiment of such a system as described with reference to Figures 3 and 3A of this specification.

The following subject matter in copending application of Wilson P. Boothroyd, Serial Number 660,905, filed April 10, 1946, now Patent No. 2,503,320, granted April 11, 1950:

(1) In a system of the general sort described, the method and means for deriving an output signal which is a function of range, comprising initiating the operation of an integrating circuit in response to the transmission of a pulse signal terminating the integration of said integrating circuit in response to the reception of the reflection of said pulse from an object, and deriving an indication of variations in the peak output of said integrating circuit, as shown and described with reference to Figures 3 and 3A of this specification.

The following subject matter in copending application of Joseph C. Tellier and Harry H. Wilson, Jr., Serial Number 660,036, filed April 6, 1946:

(1) The arrangement, in a superregenerative receiver, of a multivibrator quenching oscillator push-pull connected through a diode quenching circuit to the tank circuit of the superregenerative oscillator, as shown and described with reference to Figures 3 and 3A of this specification.

I claim:

1. In a radio ranging system, a first oscillator generating time-spaced pulse signals, a second oscillator generating other time-spaced pulse signals, means normally maintaining a predetermined difference between the frequencies of said two oscillators, a transmitter of pulse signals timed by said first oscillator pulses, a superregenerative receiver of object-reflected transmitted pulses and means for unquenching said receiver in response to pulses from said second oscillator, means responsive to the simultaneous arrival of a received pulse and unquenching of said receiver for substantially altering the phase relations of pulses from said two oscillators, and a device responsive to variations in phase between pulses from said two oscillators.

2. In a radio ranging system, a transmitter of time-spaced pulse signals, a producer of other time-spaced pulse signals, means for normally effecting a predetermined variation in the spacing between said transmitted pulses and said produced pulses, a receiver of object-reflected transmitted pulses, means responsive to the simultaneous occurrence of said received pulses and said produced pulses for interrupting said normal variation in spacing between said transmitted pulses and said produced pulses, and means for providing indications of the spacing between said transmitted pulses and said produced pulses upon the occurrence of said interruptions.

3. In a radio ranging system, a transmitter of time-spaced pulse signals, a producer of other time-spaced pulse signals, means for effecting a normally cyclic variation in the spacing between said transmitted pulses and said produced pulses, a receiver of object-reflected transmitted pulses, means responsive to the simultaneous occurrence of said received pulses and said produced pulses for interrupting said normal cyclic variation in spacing between said transmitted and produced pulses and for modifying said cyclic variation to effect coincidence of a subsequent produced pulse with a subsequent reflected pulse from the same target object prior to the time at which said coincidence would occur owing to said normal cyclic variation, and means for providing indications of the spacing between said transmitted pulses and said produced pulses upon the occurrence of said interruptions.

4. In a radio ranging system, a transmitter of time-spaced pulse signals, a producer of other time-spaced pulse signals, means for normally effecting a predetermined variation in the spacing between said transmitted pulses and said produced pulses, a superregenerative receiver of object-reflected transmitted pulses, means for utilizing said produced pulses to control the unquenching of said superregenerative receiver, means responsive to the output of said receiver upon the simultaneous occurrence of said received pulses and said produced pulses for interrupting said normal variation in spacing between said transmitted pulses and said produced pulses, and means for providing indications of the spacing between said transmitted pulses and said produced pulses upon the occurrence of said interruptions.

5. In a radio ranging system, a source of time-spaced pulse signals, means for transmitting pulses of high frequency energy under control of said pulse signals, a producer of other time-spaced pulse signals, means for normally effecting a predetermined variation in the spacing between said first-named pulses and said produced pulses, a receiver of object-reflected transmitted pulses, means responsive to the simultaneous occurrence of said received pulses and said produced pulses for interrupting said normal variation in spacing between said first-named pulses and said produced pulses, and means supplied with said first-named pulses and said produced pulses and responsive thereto to provide indications of the spacing between said first-named pulses and said produced pulses upon the occurrence of said interruptions.

WILLIAM E. BRADLEY.

REFERENCES CITED

The following references are of record in the file of this patent:

UNITED STATES PATENTS

| Number | Name | Date |
|---|---|---|
| 2,287,174 | Heising | June 23, 1942 |
| 2,302,123 | Hepp et al. | Nov. 17, 1942 |
| 2,377,894 | McCool | June 12, 1945 |
| 2,402,916 | Schroeder | June 25, 1946 |
| 2,403,527 | Hershberger | July 9, 1946 |
| 2,416,088 | Deerhake | Feb. 18, 1947 |
| 2,417,136 | Smith | Mar. 11, 1947 |
| 2,421,018 | De Rosa | May 27, 1947 |
| 2,422,382 | Winchel | June 17, 1947 |

FOREIGN PATENTS

| Number | Country | Date |
|---|---|---|
| 552,072 | Great Britain | Mar. 22, 1943 |
| 813,404 | France | June 1, 1937 |